United States Patent
Ma

(10) Patent No.: US 12,047,132 B2
(45) Date of Patent: Jul. 23, 2024

(54) UPLINK DATA TRANSMISSION METHOD, USER EQUIPMENT AND READABLE STORAGE MEDIUM

(71) Applicant: BEIJING UNISOC COMMUNICATIONS TECHNOLOGY CO., LTD., Beijing (CN)

(72) Inventor: Dawei Ma, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 17/786,697

(22) PCT Filed: Sep. 23, 2020

(86) PCT No.: PCT/CN2020/117031
§ 371 (c)(1),
(2) Date: Jun. 17, 2022

(87) PCT Pub. No.: WO2021/120755
PCT Pub. Date: Jun. 24, 2021

(65) Prior Publication Data
US 2023/0026999 A1    Jan. 26, 2023

(30) Foreign Application Priority Data
Dec. 20, 2019  (CN) .......................... 201911330014.9

(51) Int. Cl.
*H04B 7/02*   (2018.01)
*H04B 7/0456*  (2017.01)
*H04W 72/1268* (2023.01)

(52) U.S. Cl.
CPC ...... *H04B 7/0456* (2013.01); *H04W 72/1268* (2013.01)

(58) Field of Classification Search
CPC .................... H04B 7/0456; H04W 72/1268
(Continued)

(56) References Cited

U.S. PATENT DOCUMENTS

2018/0287682 A1   10/2018   Kwak et al.
2019/0280751 A1   9/2019    Tsai et al.
(Continued)

FOREIGN PATENT DOCUMENTS

CN   108809386 A   11/2018
CN   109690962 A   4/2019
(Continued)

OTHER PUBLICATIONS

Intel Corporation. "Remaining Issues on Codebook Based UL Transmission." 3GPP TSG RAN WGJ Meeting 90bis, RI-1717362., Oct. 13, 2017 (Oct. 13, 2017), parts 1-3.
(Continued)

*Primary Examiner* — Zewdu A Kassa
(74) *Attorney, Agent, or Firm* — Harness, Dickey & Pierce, P.L.C.

(57) ABSTRACT

An uplink data transmission method, a user equipment and a readable storage medium are provided. The method includes: receiving uplink scheduling information, wherein the uplink scheduling information comprises indication information of a Transmitted Precoding Matrix Indicator (TPMI) corresponding to each subband used for transmitting the uplink data, and the indication information of the TPMI corresponding to each subband corresponds to a same Rank Indicator (RI) information; determining a precoding matrix corresponding to each subband based on the indication information of the TPMI corresponding to each subband,
(Continued)

respectively; and precoding the uplink data to be transmitted on each subband based on the precoding matrix corresponding to each subband, respectively, and transmitting the uplink data.

17 Claims, 1 Drawing Sheet

(58) Field of Classification Search
USPC ............... 375/267, 260, 259, 219, 295, 316
See application file for complete search history.

(56) References Cited

U.S. PATENT DOCUMENTS

| | | |
|---|---|---|
| 2019/0356371 A1 | 11/2019 | Osawa et al. |
| 2020/0099423 A1 | 3/2020 | Ren et al. |
| 2021/0068142 A1* | 3/2021 | Park .................. H04B 7/0456 |
| 2022/0132489 A1* | 4/2022 | Kim .................... H04B 7/024 |

FOREIGN PATENT DOCUMENTS

| | | |
|---|---|---|
| CN | 110463244 A | 11/2019 |
| CN | 111010738 A | 4/2020 |

OTHER PUBLICATIONS

International Search Report (English and Chinese) and Written Opinion of the International Searching Authority (Chinese) issued in PCT/CN2020/117031, mailed Dec. 25, 2020; ISA/CN.

\* cited by examiner

UPLINK DATA TRANSMISSION METHOD, USER EQUIPMENT AND READABLE STORAGE MEDIUM

CROSS-REFERENCE TO RELATED APPLICATIONS

This application is the national phase of International Application No. PCT/CN2020/117031, filed on Sep. 23, 2020, which claims priority to Chinese Patent Application No. 201911330014.9, filed on Dec. 20, 2019, and entitled "UPLINK DATA TRANSMISSION METHOD, USER EQUIPMENT AND READABLE STORAGE MEDIUM", the entire disclosures of the above applications are expressly incorporated by reference herein.

TECHNICAL FIELD

The present disclosure generally relates to communication technology field, and more particularly, to a method for transmitting uplink data, user equipment and readable storage medium.

BACKGROUND

A base station transmits uplink scheduling information to a User Equipment (UE) through a Physical Downlink Control Channel (PDCCH) for scheduling the UE to transmit uplink data.

In the Rel-15 protocol, when an uplink scheduling is performed based on a codebook, the uplink scheduling information carried by the PDCCH includes a domain named "Precoding information and number of layers", the domain is used for indicating Rank Indicator (RI) information adopted by entire scheduling resources and Transmitted Precoding Matrix Indicator (TPMI) information. The TPMI adopted by the entire scheduling resources is called a wideband TPMI.

Due to the Rel-15 protocol only supports an indication of the wideband TPMI, reliability of uplink data transmission is relatively low. There is a need for improving the reliability of the uplink data transmission

SUMMARY

Embodiments of the present disclosure provide a method for improving reliability of uplink data transmission.

In an embodiment of the present disclosure, a method for transmitting uplink data is provided, including: receiving uplink scheduling information, wherein the uplink scheduling information includes indication information of a Transmitted Precoding Matrix Indicator (TPMI) corresponding to each subband used for transmitting the uplink data, and the indication information of the TPMI corresponding to each subband corresponds to a same Rank Indicator (RI) information; determining a precoding matrix corresponding to each subband based on the indication information of the TPMI corresponding to each subband, respectively; and precoding the uplink data to be transmitted on each subband based on the precoding matrix corresponding to each subband, respectively, and transmitting the uplink data.

In an embodiment of the present disclosure, a User Equipment (UE) for transmitting uplink data is provided, including: a receiving circuitry, adapted to receive uplink scheduling information, wherein the uplink scheduling information includes indication information of a Transmitted Precoding Matrix Indicator (TPMI) corresponding to each subband used for transmitting the uplink data, and the indication information of the TPMI corresponding to each subband corresponds to a same Rank Indicator (RI) information; a determining circuitry, adapted to determine a precoding matrix corresponding to each subband based on the indication information of the TPMI corresponding to each subband, respectively; and a transmitting circuitry, adapted to precode the uplink data to be transmitted on each subband based on the precoding matrix corresponding to each subband, respectively, and transmit the uplink data.

In an embodiment of the present disclosure, a non-transitory computer-readable storage medium storing one or more programs, the one or more programs comprising computer instructions, which, when executed by a processor, cause the processor to: receive uplink scheduling information, wherein the uplink scheduling information comprises indication information of a Transmitted Precoding Matrix Indicator (TPMI) corresponding to each subband used for transmitting the uplink data, and the indication information of the TPMI corresponding to each subband corresponds to a same Rank Indicator (RI) information; determine a precoding matrix corresponding to each subband based on the indication information of the TPMI corresponding to each subband, respectively; and precode the uplink data to be transmitted on each subband based on the precoding matrix corresponding to each subband, respectively, and transmitting the uplink data.

DETAILED DESCRIPTION

Due to the Rel-15 protocol only supports an indication of a wideband TPMI, the UE uses a same precoding matrix when transmitting uplink data on each subband, resulting in poor coding accuracy for the UE on each subband. When a base station receives the uplink data transmitted by the UE, the signal to noise ratio is low, which eventually leads to relatively low reliability of uplink data transmission.

In the embodiment of the present disclosure, a method for transmitting uplink data is provided. According to embodiments of the present disclosure, the uplink scheduling information transmitted by the base station includes indication information of a Transmitted Precoding Matrix Indicator (TPMI) corresponding to each subband used for transmitting the uplink data, the UE may use corresponding TPMI in different subbands for transmitting the uplink data, thereby improving the reliability of the data transmission.

In order to clarify the object, characteristic and advantages of embodiments of the present disclosure, the embodiments of present disclosure will be described clearly in detail in conjunction with accompanying drawings.

Figure 1:
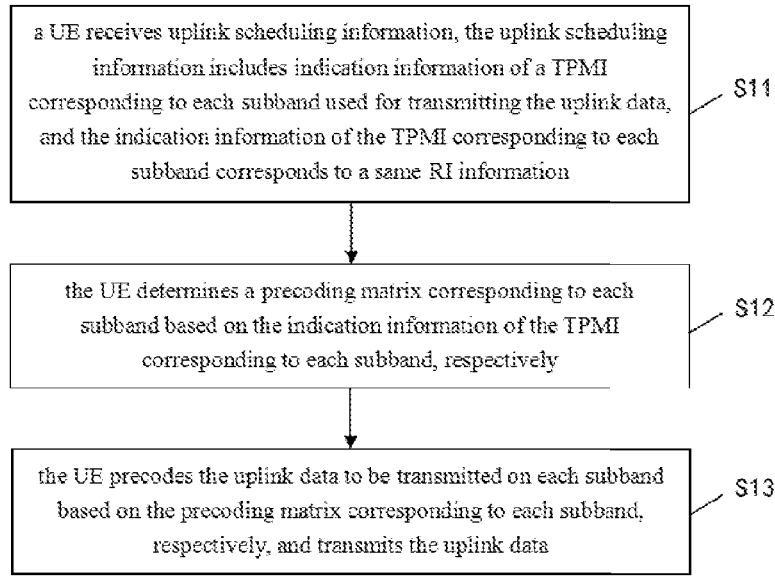
FIG. 1 schematically illustrates a flowchart of a method for transmitting uplink data according to an embodiment of the present disclosure.

Referring to FIG. 1, a method for transmitting uplink data is provided in an embodiment of the present disclosure. The method may include S11, S12, and S13.

In S11, a User Equipment (UE) receives uplink scheduling information, the uplink scheduling information includes indication information of a Transmitted Precoding Matrix Indicator (TPMI) corresponding to each subband used for transmitting the uplink data, and the indication information of the TPMI corresponding to each subband corresponds to a same Rank Indicator (RI) information.

In a specific implementation, Downlink Control Information (DCI) carried by a PDCCH includes the indication information of the TPMI corresponding to each subband used for transmitting the uplink data.

For example, a number of subbands used for the uplink transmission is 3, which are subband 1, subband 2 and subband 3, respectively. In this case, the DCI includes the indication information of the TPMI corresponding to the subband 1, the indication information of the TPMI corresponding to the subband 2, and the indication information of the TPMI corresponding to the subband 3.

In S12, the UE determines a precoding matrix corresponding to each subband based on the indication information of the TPMI corresponding to each subband, respectively.

In a specific implementation, a base station may configure a matching TPMI index value for each subband based on channel condition of each subband. When indicating in the DCI, the base station may indicate the TPMI corresponding to each subband in various ways.

In a specific implementation, the subband used for transmitting the uplink data may include: a first subband and other subbands other than the first subband. The TPMI index value corresponding to the first subband is a first TPMI index value in the TPMI index values set. The first subband is one of the subbands used for transmitting the uplink data.

The indication information of the TPMI corresponding to each subband includes: indication information of a TPMI corresponding to the first subband, and indication information of TPMIs corresponding to other subbands.

In an embodiment of the present disclosure, in order to save a number of bits occupied by the indication of the TPMI index value information corresponding to each subband, the indication information of the TPMI corresponding to the first subband includes the TPMI index value corresponding to the first subband.

The UE determines the precoding matrix corresponding to each subband based on the indication information of the TPMI corresponding to each subband, respectively, including below processes.

The UE determines a corresponding TPMI index values set based on the indication information of the TPMI corresponding to the first subband, the corresponding TPMI index values set includes the TPMI index value corresponding to the first subband. The UE determines TPMIs index values corresponding to other subbands in the TPMI index values set based on the indication information of the TPMIs corresponding to other subbands. And the UE determines the precoding matrix corresponding to each subband based on the TPMI index value corresponding to each subband, respectively.

In an embodiment of the present disclosure, in order to save a number of bits occupied by the indication of the TPMI index value information corresponding to other subbands, the indication information of the TPMIs corresponding to other subbands includes: position information of the TPMI index values corresponding to the other subbands in the TPMI index values set.

That is, except for the specific implementation of the TPMI index value of the first subband, for other subbands, in the DCI, the base station only indicates position information of a TPMI index value corresponding to any subband in the other subbands in the TPMI index values set. The TPMI index value corresponding to the first subband may be a first TPMI index value in the TPMI index values set by default. After determining the TPMI index values set, the TPMI index value corresponding to any subband in the other subbands may be determined based on the information carried in the DCI.

For example, the base station may indicate that a TPMI index value corresponding to a second subband in the DCI is a third TPMI index value in the TPMI index values set, and a TPMI index value corresponding to a third subband in the DCI is a second TPMI index value in the TPMI index values set.

In a specific implementation, the TPMI index values set may be set in various ways.

In an embodiment of the present disclosure, TPMI index values in the TPMI index values set may be a TPMI index values set corresponding to precoding matrices in all precoding matrix tables, or may be a TPMI index values set corresponding to precoding matrices in the partial coding matrix tables, or may be a TPMI index values set corresponding to some or all of precoding matrices in a precoding matrix table.

In another embodiment of the present disclosure, the TPMI index values set may include a set of TPMI index values corresponding to precoding matrices with a same antenna coherence type in a precoding matrix table.

The antenna coherence types may include following three types: full coherence, partial coherence and incoherence. The TPMI index values set may include a set of TPMI index values corresponding to precoding matrices with any one of the above-mentioned antenna coherence types in the precoding matrix table, which may reduce overhead indicated by the precoding matrix, and ensure that all subbands use a same coherence type of precoding.

For example, in a precoding matrix table as shown in Table 1, antenna coherence types of precoding matrices corresponding to TPMI index values of 2, 3, 4 and 5 are full coherence, and antenna coherence types of precoding matrices corresponding to TPMI index values of 0 and 1 are incoherence. Therefore, the TPMI index values set may be [2, 3, 4, 5], or may be [0, 1].

In an embodiment of the present disclosure, the TPMI index values set may include a set of TPMI index values corresponding to precoding matrices with a same non-zero power antenna in a precoding matrix table, which may reduce overhead indicated by the precoding matrix, and it is convenient for the UE to control power.

For example, for a UE with 4 antenna ports, if power of a second antenna and a fourth antenna is non-zero values, TPMI index values corresponding to precoding matrices of the second antenna and the fourth antenna may be selected for setting the TPMI index values set.

In an embodiment of the present disclosure, the TPMI index values set may also include a set of TPMI index values corresponding to precoding matrices with a same phase difference between antennas which are in a same polarization direction in a precoding matrix table, so as to reduce overhead indicated by the precoding matrix, and ensure that antennas in a same polarization direction having a same phase difference.

For example, for a UE with 4 antenna ports, if polarization directions of a first antenna and a third antenna are the same, precoding matrices with a same phase difference may be selected from precoding matrices of the first antenna and the third antenna, such as precoding matrices with a phase difference of 0, or precoding matrices with a phase difference of 180. Based on the selected precoding matrix, the corresponding TPMI index values are determined to constitute the TPMI index values set.

After determining the TPMI index value corresponding to each subband, the precoding matrix corresponding to each subband may be determined based on the TPMI index value corresponding to each subband.

Table 1 is one of precoding matrix tables in the 3GPP TS38.212 protocol, and a same precoding matrix table corresponds to a same RI. For a UE which supports coherent codebook transmission with two antenna ports, a corresponding precoding matrix may be obtained from Table 1. For example, as shown in Table 1, when a TPMI index value is 2, a corresponding precoding matrix is $$\frac{1}{\sqrt{2}}\begin{bmatrix}1\\0\end{bmatrix}.$$

TABLE 1

| TPMI index value | precoding matrix |
| --- | --- |
| 0 | $\frac{1}{\sqrt{2}}\begin{bmatrix}1\\0\end{bmatrix}$ |
| 1 | $\frac{1}{\sqrt{2}}\begin{bmatrix}0\\1\end{bmatrix}$ |
| 2 | $\frac{1}{\sqrt{2}}\begin{bmatrix}1\\1\end{bmatrix}$ |
| 3 | $\frac{1}{\sqrt{2}}\begin{bmatrix}1\\-1\end{bmatrix}$ |
| 4 | $\frac{1}{\sqrt{2}}\begin{bmatrix}1\\j\end{bmatrix}$ |
| 5 | $\frac{1}{\sqrt{2}}\begin{bmatrix}1\\-j\end{bmatrix}$ |

In S13, the UE precodes the uplink data to be transmitted on each subband based on the precoding matrix corresponding to each subband, respectively, and transmits the uplink data.

Due to the TPMI index value corresponding to each subband being the TPMI corresponding to the subband, after determining the TPMI index value corresponding to each subband, the UE may obtain the corresponding precoding matrix by searching the precoding matrix table, and use the precoding matrix to precode the uplink data to be transmitted on each band. After precoding, the UE may process the data accordingly and transmit the data to the base station.

It can be seen from above that using the above method for transmitting uplink data, the base station may schedule the TPMI corresponding to each subband, which improves flexibility of scheduling. The UE may accurately select the corresponding precoding matrix based on the TPMI corresponding to each subband, which improves accuracy of encoding, thereby improving reliability of the uplink data transmission.

In order to enable those skilled in the art to better understand and implement the present disclosure, a device and a computer-readable storage media corresponding to the above methods are described in detail below.

Figure 2:
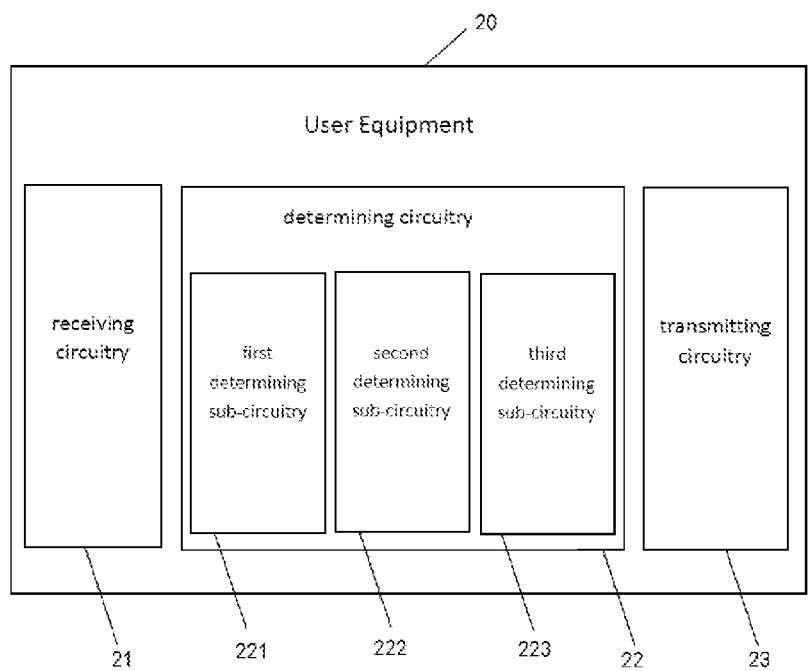
FIG. 2 schematically illustrates a structural diagram of a User Equipment (UE) for transmitting uplink data according to an embodiment of the present disclosure.

Referring to FIG. 2, a UE 20 is provided in the embodiment of the present disclosure, the UE 20 may include: a receiving circuitry 21, a determining circuitry 22 and a transmitting circuitry 23.

Wherein, the receiving circuitry 21 is adapted to receive uplink scheduling information, the uplink scheduling information includes indication information of a Transmitted Precoding Matrix Indicator (TPMI) corresponding to each subband used for transmitting the uplink data, and the indication information of the TPMI corresponding to each subband corresponds to a same Rank Indicator (RI) information.

The determining circuitry 22 is adapted to determine a precoding matrix corresponding to each subband based on the indication information of the TPMI corresponding to each subband, respectively.

The transmitting circuitry 23 is adapted to precode the uplink data to be transmitted on each subband based on the precoding matrix corresponding to each subband, respectively, and transmit the uplink data.

In an embodiment of the present disclosure, the subband used for transmitting the uplink data includes: a first subband and other subbands other than the first subband.

The indication information of the TPMI corresponding to each subband includes: indication information of a TPMI corresponding to the first subband, and indication information of TPMIs corresponding to other subbands.

In an embodiment of the present disclosure, the indication information of the TPMI corresponding to the first subband includes a TPMI index value corresponding to the first subband.

The determining circuitry 22 may include: a first determining sub-circuitry 221, a second determining sub-circuitry 222 and a third determining sub-circuitry 223.

Wherein, the first determining sub-circuitry 221 is adapted to determine a corresponding TPMI index values set based on the indication information of the TPMI corresponding to the first subband, the corresponding TPMI index values set includes the TPMI index value corresponding to the first subband.

The second determining sub-circuitry 222 is adapted to determine TPMIs index values corresponding to other subbands in the TPMI index values set based on the indication information of the TPMIs corresponding to other subbands.

The third determining sub-circuitry 223 is adapted to determine the precoding matrix corresponding to each subband based on the TPMI index value corresponding to each subband, respectively.

In an embodiment of the present disclosure, the indication information of the TPMIs corresponding to other subbands includes: position information of the TPMI index values corresponding to the other subbands in the TPMI index values set.

In an embodiment of the present disclosure, the TPMI index values set includes a set of TPMI index values corresponding to precoding matrices with a same antenna coherence type in a precoding matrix table.

In another embodiment of the present disclosure, the TPMI index values set includes a set of TPMI index values corresponding to precoding matrices with a same non-zero power antenna in a precoding matrix table.

In an embodiment of the present disclosure, the TPMI index values set includes a set of TPMI index values corresponding to precoding matrices with a same phase difference between antennas which are in a same polarization direction in a precoding matrix table.

It can be seen from the above that, in the embodiment of the present disclosure, the UE 20 may use corresponding TPMI in different subbands for transmitting the uplink data when transmitting the uplink data, thereby improving the reliability of the data transmission.

In an embodiment of the present disclosure, a computer-readable storage medium having computer instructions stored therein is provided, wherein when the computer instructions are executed, any one of the above methods for transmitting uplink data is performed.

In some embodiment, the computer-readable storage medium may include: ROM, RAM, disk, optical disk or the like.

In an embodiment of the present disclosure, a UE including a memory and a processor is provided, wherein the memory has computer instructions stored therein, and when the processor executes the computer instructions, any one of the above methods for transmitting uplink data is performed, which is not be repeated here.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for transmitting uplink data, comprising:
receiving uplink scheduling information, wherein the uplink scheduling information comprises indication information of a Transmitted Precoding Matrix Indicator (TPMI) corresponding to each subband used for transmitting the uplink data, and the indication information of the TPMI corresponding to each subband corresponds to a same Rank Indicator (RI) information;
determining a precoding matrix corresponding to each subband based on the indication information of the TPMI corresponding to each subband, respectively; and
precoding the uplink data to be transmitted on each subband based on the precoding matrix corresponding to each subband, respectively, and transmitting the uplink data;
wherein the subband used for transmitting the uplink data comprises: a first subband and other subbands other than the first subband; and
the indication information of the TPMI corresponding to each subband comprises: indication information of a TPMI corresponding to the first subband, and indication information of TPMIs corresponding to other subbands.

2. The method according to claim 1, wherein the indication information of the TPMI corresponding to the first subband comprises a TPMI index value corresponding to the first subband;
said determining the precoding matrix corresponding to each subband based on the indication information of the TPMI corresponding to each subband, respectively, comprises:
determining a corresponding TPMI index values set based on the indication information of the TPMI corresponding to the first subband, wherein the corresponding TPMI index values set comprises the TPMI index value corresponding to the first subband;
determining TPMIs index values corresponding to other subbands in the TPMI index values set based on the indication information of the TPMIs corresponding to other subbands; and
determining the precoding matrix corresponding to each subband based on the TPMI index value corresponding to each subband, respectively.

3. The method according to claim 2, wherein the indication information of the TPMIs corresponding to other subbands comprises: position information of the TPMI index values corresponding to the other subbands in the TPMI index values set.

4. The method according to claim 2, wherein the TPMI index values set comprises a set of TPMI index values corresponding to precoding matrices with a same antenna coherence type in a precoding matrix table.

5. The method according to claim 2, wherein the TPMI index values set comprises a set of TPMI index values corresponding to precoding matrices with a same non-zero power antenna in a precoding matrix table.

6. The method according to claim 2, wherein the TPMI index values set comprises a set of TPMI index values corresponding to precoding matrices with a same phase difference between antennas which are in a same polarization direction in a precoding matrix table.

7. A User Equipment (UE) for transmitting uplink data, comprising:
a receiving circuitry, adapted to receive uplink scheduling information, wherein the uplink scheduling information comprises indication information of a Transmitted Precoding Matrix Indicator (TPMI) corresponding to each subband used for transmitting the uplink data, and the indication information of the TPMI corresponding to each subband corresponds to a same Rank Indicator (RI) information;
a determining circuitry, adapted to determine a precoding matrix corresponding to each subband based on the indication information of the TPMI corresponding to each subband, respectively; and
a transmitting circuitry, adapted to precode the uplink data to be transmitted on each subband based on the precoding matrix corresponding to each subband, respectively, and transmit the uplink data;
wherein the subband used for transmitting the uplink data comprises: a first subband and other subbands other than the first subband; and
the indication information of the TPMI corresponding to each subband comprises: indication information of a TPMI corresponding to the first subband, and indication information of TPMIs corresponding to other subbands.

8. The UE according to claim 7, wherein the indication information of the TPMI corresponding to the first subband comprises a TPMI index value corresponding to the first subband;
the determining circuitry comprises:
a first determining sub-circuitry, adapted to determine a corresponding TPMI index values set based on the indication information of the TPMI corresponding to the first subband, the corresponding TPMI index values set comprises the TPMI index value corresponding to the first subband;
a second determining sub-circuitry, adapted to determine TPMIs index values corresponding to other subbands in the TPMI index values set based on the indication information of the TPMIs corresponding to other subbands; and
a third determining sub-circuitry, adapted to determine the precoding matrix corresponding to each subband based on the TPMI index value corresponding to each subband, respectively.

9. The UE according to claim 8, wherein the indication information of the TPMIs corresponding to other subbands comprises: position information of the TPMI index values corresponding to the other subbands in the TPMI index values set.

10. The UE according to claim 8, wherein the TPMI index values set comprises a set of TPMI index values corresponding to precoding matrices with a same antenna coherence type in a precoding matrix table.

11. The UE according to claim 8, wherein the TPMI index values set comprises a set of TPMI index values corresponding to precoding matrices with a same non-zero power antenna in a precoding matrix table.

12. The UE according to claim 7, wherein the TPMI index values set comprises a set of TPMI index values corresponding to precoding matrices with a same phase difference between antennas which are in a same polarization direction in a precoding matrix table.

13. A non-transitory computer-readable storage medium storing one or more programs, the one or more programs comprising computer instructions, which, when executed by a processor, cause the processor to:
  receive uplink scheduling information, wherein the uplink scheduling information comprises indication information of a Transmitted Precoding Matrix Indicator (TPMI) corresponding to each subband used for transmitting the uplink data, and the indication information of the TPMI corresponding to each subband corresponds to a same Rank Indicator (RI) information;
  determine a precoding matrix corresponding to each subband based on the indication information of the TPMI corresponding to each subband, respectively; and
  precode the uplink data to be transmitted on each subband based on the precoding matrix corresponding to each subband, respectively, and transmit the uplink data;
  wherein the subband used for transmitting the uplink data comprises: a first subband and other subbands other than the first subband; and
  the indication information of the TPMI corresponding to each subband comprises: indication information of a TPMI corresponding to the first subband, and indication information of TPMIs corresponding to other subbands.

14. The non-transitory computer-readable storage medium according to claim 13, wherein the indication information of the TPMI corresponding to the first subband comprises a TPMI index value corresponding to the first subband;
  said determining the precoding matrix corresponding to each subband based on the indication information of the TPMI corresponding to each subband, respectively, comprises:
  determining a corresponding TPMI index values set based on the indication information of the TPMI corresponding to the first subband, wherein the corresponding TPMI index values set comprises the TPMI index value corresponding to the first subband;
  determining TPMIs index values corresponding to other subbands in the TPMI index values set based on the indication information of the TPMIs corresponding to other subbands; and
  determining the precoding matrix corresponding to each subband based on the TPMI index value corresponding to each subband, respectively.

15. The non-transitory computer-readable storage medium according to claim 14, wherein the indication information of the TPMIs corresponding to other subbands comprises: position information of the TPMI index values corresponding to the other subbands in the TPMI index values set.

16. The non-transitory computer-readable storage medium according to claim 14, wherein the TPMI index values set comprises a set of TPMI index values corresponding to precoding matrices with a same antenna coherence type in a precoding matrix table.

17. The non-transitory computer-readable storage medium according to claim 14, wherein the TPMI index values set comprises a set of TPMI index values corresponding to precoding matrices with a same non-zero power antenna in a precoding matrix table.

* * * * *